US008843398B2

(12) United States Patent
Argue et al.

(10) Patent No.: US 8,843,398 B2
(45) Date of Patent: Sep. 23, 2014

(54) TRANSFERRING DIGITAL RECEIPT DATA TO MOBILE DEVICES

(75) Inventors: Stuart Argue, Palo Alto, CA (US); Anthony Emile Marcar, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 56 days.

(21) Appl. No.: 13/556,056

(22) Filed: Jul. 23, 2012

(65) Prior Publication Data

US 2014/0025517 A1   Jan. 23, 2014

(51) Int. Cl.
| | |
|---|---|
| G06Q 20/00 | (2012.01) |
| G07G 1/12 | (2006.01) |
| G06Q 20/20 | (2012.01) |
| G07G 1/14 | (2006.01) |
| G06Q 30/02 | (2012.01) |
| G06Q 30/06 | (2012.01) |

(52) U.S. Cl.
CPC ............... *G06Q 20/202* (2013.01); *G07G 1/12* (2013.01); *G06Q 20/204* (2013.01); *G07G 1/14* (2013.01); *G06Q 30/02* (2013.01); *G06Q 30/06* (2013.01); *G06Q 20/20* (2013.01)
USPC ............................................. 705/21; 705/16

(58) Field of Classification Search
CPC ..... G06Q 20/202; G06Q 20/20; G06Q 30/06; G06Q 30/02; G06Q 20/204; G07G 1/14; G07G 1/12
USPC ...................................................... 705/21, 16
See application file for complete search history.

(56) References Cited

U.S. PATENT DOCUMENTS

| | | | |
|---|---|---|---|
| 5,297,908 A * | 3/1994 | Knott | 410/26 |
| 5,857,079 A * | 1/1999 | Claus et al. | 705/33 |
| 6,587,835 B1 * | 7/2003 | Treyz et al. | 705/14.64 |
| 6,738,749 B1 * | 5/2004 | Chasko | 705/17 |

(Continued)

FOREIGN PATENT DOCUMENTS

| | | |
|---|---|---|
| EP | 1952265 A2 | 8/2008 |
| EP | 1794707 A4 | 7/2009 |

OTHER PUBLICATIONS

Mobile payments in US: Mapping out the road by Darin Contini & Marianne Crowe: Fed Reserve Bank of Boston, Mar. 25, 2011:57 pp. 1-57.*

(Continued)

*Primary Examiner* — Matthew Gart
*Assistant Examiner* — Harshad Parikh
(74) *Attorney, Agent, or Firm* — David R. Stevens; Stevens Law Group

(57) ABSTRACT

The present invention extends to methods, systems, and computer program products for transferring digital receipt data to mobile devices. A point-of-sale ("POS") system generates digital receipt data as part of a sales transaction. The point-of-sale ("POS") system and a mobile device, possibly also along with a receipt data server, interoperate with one another to transfer digital receipt data generated to the mobile device. In some embodiments, the point-of-sale ("POS") system transfers digital receipt data for a sales transaction to the receipt data server. An identifier, such as, for example, an application identifier or transaction identifier, is stored along with the digital receipt data to match the digital receipt data with the mobile device. The mobile device subsequently uses the identifier to access the digital receipt data from the receipt data server. In other embodiments, the point-of-sale ("POS") system transfers digital receipt data directly to the mobile device.

18 Claims, 11 Drawing Sheets

(56) References Cited

U.S. PATENT DOCUMENTS

| | | | |
|---|---|---|---|
| 6,877,093 B1* | 4/2005 | Desai et al. ............. | 713/156 |
| 6,991,158 B2* | 1/2006 | Munte ..................... | 235/379 |
| 7,119,659 B2* | 10/2006 | Bonalle et al. ........... | 340/5.61 |
| 7,344,070 B2* | 3/2008 | Nobutani ................. | 235/383 |
| 7,487,912 B2* | 2/2009 | Seifert et al. ............ | 235/380 |
| 7,580,699 B1* | 8/2009 | Shaw et al. .............. | 455/410 |
| 7,992,781 B2 | 8/2011 | Hammad | |
| 8,005,426 B2 | 8/2011 | Huomo | |
| 8,095,113 B2 | 1/2012 | Kean | |
| 8,160,959 B2* | 4/2012 | Rackley et al. .......... | 705/39 |
| 8,180,682 B2 | 5/2012 | Narayanaswami | |
| 8,239,276 B2* | 8/2012 | Lin et al. ................. | 705/26.1 |
| 8,239,286 B2* | 8/2012 | Davis et al. .............. | 705/26.7 |
| 8,352,323 B2* | 1/2013 | Fisher .................... | 705/16 |
| 8,370,220 B1* | 2/2013 | Goodwin, III .......... | 705/28 |
| 8,376,227 B2* | 2/2013 | Hammad et al. ........ | 235/384 |
| 8,386,349 B2* | 2/2013 | Dixon et al. ............. | 705/17 |
| 8,412,590 B2* | 4/2013 | Elliott .................... | 705/26.9 |
| 8,478,692 B2* | 7/2013 | Carlson et al. .......... | 705/44 |
| 8,523,069 B2* | 9/2013 | Hammad et al. ........ | 235/384 |
| 8,527,348 B2* | 9/2013 | Petrov ..................... | 705/14.64 |
| 8,583,494 B2* | 11/2013 | Fisher .................... | 705/16 |
| 8,589,237 B2* | 11/2013 | Fisher .................... | 705/16 |
| 2004/0193538 A1* | 9/2004 | Raines ..................... | 705/39 |
| 2006/0165060 A1 | 7/2006 | Dua | |
| 2006/0273163 A1* | 12/2006 | Gusler et al. ............ | 235/383 |
| 2007/0022058 A1* | 1/2007 | Labrou et al. ........... | 705/67 |
| 2007/0038516 A1 | 2/2007 | Apple | |
| 2007/0069013 A1* | 3/2007 | Seifert et al. ............ | 235/383 |
| 2007/0131759 A1 | 6/2007 | Cox | |
| 2007/0205278 A1* | 9/2007 | Lovett ..................... | 235/383 |
| 2007/0244811 A1* | 10/2007 | Tumminaro .............. | 705/39 |
| 2007/0288320 A1* | 12/2007 | Cooper et al. ........... | 705/16 |
| 2008/0034221 A1* | 2/2008 | Hammad et al. ........ | 713/190 |
| 2008/0052236 A1* | 2/2008 | Narayanaswami et al. ..... | 705/44 |
| 2008/0126260 A1 | 5/2008 | Cox et al. | |
| 2008/0207203 A1 | 8/2008 | Arthur | |
| 2008/0207234 A1* | 8/2008 | Arthur et al. ............ | 455/466 |
| 2008/0208741 A1 | 8/2008 | Arthur | |
| 2008/0208742 A1 | 8/2008 | Arthur | |
| 2008/0208743 A1 | 8/2008 | Arthur | |
| 2008/0208744 A1 | 8/2008 | Arthur | |
| 2008/0208762 A1 | 8/2008 | Arthur | |
| 2008/0255947 A1 | 10/2008 | Friedman | |
| 2009/0070272 A1* | 3/2009 | Jain ........................ | 705/75 |
| 2009/0098825 A1 | 4/2009 | Huomo | |
| 2009/0104888 A1 | 4/2009 | Cox | |
| 2009/0144161 A1* | 6/2009 | Fisher .................... | 705/16 |
| 2009/0182638 A1* | 7/2009 | Taylor .................... | 705/17 |
| 2009/0200371 A1 | 8/2009 | Kean | |
| 2009/0271211 A1 | 10/2009 | Hammad | |
| 2009/0271263 A1 | 10/2009 | Regmi | |
| 2009/0271264 A1 | 10/2009 | Regmi | |
| 2009/0271265 A1* | 10/2009 | Lay et al. ................ | 705/14.38 |
| 2009/0271266 A1 | 10/2009 | Regmi | |
| 2009/0271270 A1 | 10/2009 | Regmi | |
| 2009/0271275 A1 | 10/2009 | Regmi | |
| 2009/0271322 A1* | 10/2009 | Lay et al. ................ | 705/75 |
| 2009/0288012 A1 | 11/2009 | Hertel et al. | |
| 2009/0307778 A1* | 12/2009 | Mardikar ................ | 726/26 |
| 2009/0313105 A1* | 12/2009 | Magnusson ............. | 705/14.25 |
| 2009/0313132 A1 | 12/2009 | McKenna | |
| 2009/0327308 A1 | 12/2009 | Carter | |
| 2010/0039666 A1* | 2/2010 | Tsukada .................. | 358/1.15 |
| 2010/0057624 A1* | 3/2010 | Hurt et al. ............... | 705/76 |
| 2010/0082454 A1 | 4/2010 | Narayanaswami | |
| 2010/0100434 A1* | 4/2010 | Sock ....................... | 705/14.38 |
| 2010/0125510 A1* | 5/2010 | Smith et al. ............. | 705/17 |
| 2010/0125737 A1 | 5/2010 | Kang | 713/176 |
| 2010/0161433 A1* | 6/2010 | White ..................... | 705/17 |
| 2010/0250356 A1* | 9/2010 | Gillenson et al. ....... | 705/14.18 |
| 2010/0274678 A1* | 10/2010 | Rolf et al. ............... | 705/17 |
| 2010/0274720 A1* | 10/2010 | Carlson et al. .......... | 705/44 |
| 2010/0320266 A1* | 12/2010 | White ..................... | 235/375 |
| 2011/0022463 A1* | 1/2011 | Harris ..................... | 705/14.51 |
| 2011/0053560 A1* | 3/2011 | Jain et al. ................ | 455/411 |
| 2011/0060631 A1* | 3/2011 | Grossman et al. ....... | 705/14.13 |
| 2011/0066516 A1* | 3/2011 | Hammad et al. ........ | 705/17 |
| 2011/0106659 A1 | 5/2011 | Faith | |
| 2011/0125598 A1* | 5/2011 | Shin et al. ............... | 705/17 |
| 2011/0145049 A1 | 6/2011 | Hertel | |
| 2011/0145082 A1 | 6/2011 | Hammad | |
| 2011/0145148 A1 | 6/2011 | Hammad | |
| 2011/0161186 A1* | 6/2011 | Shah et al. .............. | 705/16 |
| 2011/0161230 A1* | 6/2011 | Singh ...................... | 705/44 |
| 2011/0165836 A1* | 7/2011 | Dixon et al. ............. | 455/41.1 |
| 2011/0177852 A1* | 7/2011 | Jain et al. ................ | 455/575.8 |
| 2011/0191161 A1* | 8/2011 | Dai ......................... | 705/14.38 |
| 2011/0202415 A1* | 8/2011 | Casares et al. .......... | 705/17 |
| 2011/0202465 A1 | 8/2011 | Mashhour | |
| 2011/0202466 A1* | 8/2011 | Carter ..................... | 705/67 |
| 2011/0208656 A1* | 8/2011 | Alba et al. ............... | 705/65 |
| 2011/0218880 A1* | 9/2011 | Hammad et al. ........ | 705/26.41 |
| 2011/0244920 A1* | 10/2011 | Coppinger ............... | 455/558 |
| 2011/0251892 A1* | 10/2011 | Laracey .................. | 705/14.51 |
| 2011/0251910 A1* | 10/2011 | Dimmick ................ | 705/17 |
| 2011/0258121 A1* | 10/2011 | Kauniskangas et al. ........ | 705/67 |
| 2011/0264501 A1* | 10/2011 | Clyne ..................... | 705/14.25 |
| 2011/0302083 A1 | 12/2011 | Bhinder | |
| 2011/0307318 A1* | 12/2011 | LaPorte et al. .......... | 705/14.33 |
| 2011/0307342 A1* | 12/2011 | Haji ........................ | 705/24 |
| 2011/0313870 A1* | 12/2011 | Eicher et al. ............. | 705/16 |
| 2012/0022958 A1 | 1/2012 | de Sylva | |
| 2012/0080520 A1* | 4/2012 | Kochevar ................ | 235/382 |
| 2012/0084391 A1* | 4/2012 | Patel et al. ............... | 709/217 |
| 2012/0088470 A1* | 4/2012 | Raleigh .................. | 455/406 |
| 2012/0089514 A1* | 4/2012 | Kraemling et al. ...... | 705/42 |
| 2012/0095853 A1* | 4/2012 | von Bose et al. ........ | 705/16 |
| 2012/0116956 A1* | 5/2012 | Altman et al. ........... | 705/39 |
| 2012/0123883 A1* | 5/2012 | Charrat ................... | 705/17 |
| 2012/0123884 A1* | 5/2012 | Bhasin .................... | 705/21 |
| 2012/0143702 A1* | 6/2012 | Ho .......................... | 705/16 |
| 2012/0160912 A1* | 6/2012 | Laracey .................. | 235/379 |
| 2012/0172026 A1* | 7/2012 | Kwon et al. ............. | 455/419 |
| 2012/0173427 A1 | 7/2012 | Sparks | |
| 2012/0185306 A1* | 7/2012 | Cheng .................... | 705/14.4 |
| 2012/0191597 A1* | 7/2012 | Capel et al. ............. | 705/39 |
| 2012/0203614 A1* | 8/2012 | Chen et al. .............. | 705/14.25 |
| 2012/0209750 A1* | 8/2012 | Raleigh .................. | 705/27.1 |
| 2012/0214416 A1* | 8/2012 | Kent et al. ............... | 455/41.2 |
| 2012/0221446 A1* | 8/2012 | Grigg et al. ............. | 705/30 |
| 2012/0231844 A1* | 9/2012 | Coppinger ............... | 455/558 |
| 2012/0239578 A1* | 9/2012 | Kang et al. .............. | 705/71 |
| 2012/0239579 A1* | 9/2012 | Wolfs et al. ............. | 705/72 |
| 2012/0253915 A1* | 10/2012 | Sock ....................... | 705/14.34 |
| 2012/0259775 A1* | 10/2012 | Gui ......................... | 705/41 |
| 2012/0265679 A1* | 10/2012 | Calman et al. .......... | 705/43 |
| 2012/0268241 A1* | 10/2012 | Hanna et al. ............ | 340/5.52 |
| 2012/0276845 A1* | 11/2012 | Wikander ............... | 455/41.1 |
| 2012/0284081 A1* | 11/2012 | Cheng et al. ............ | 705/7.29 |
| 2012/0290422 A1* | 11/2012 | Bhinder .................. | 705/21 |
| 2012/0290480 A1* | 11/2012 | Chen ....................... | 705/44 |
| 2012/0290611 A1* | 11/2012 | Petrov .................... | 707/770 |
| 2012/0293305 A1* | 11/2012 | Shaw et al. ............. | 340/8.1 |
| 2012/0296770 A1* | 11/2012 | Lin et al. ................. | 705/26.8 |
| 2012/0317035 A1* | 12/2012 | Royyuru et al. ......... | 705/71 |
| 2012/0329394 A1* | 12/2012 | Fisher .................... | 455/41.1 |
| 2012/0330769 A1* | 12/2012 | Arceo ..................... | 705/21 |
| 2013/0073365 A1* | 3/2013 | McCarthy ............... | 705/14.23 |
| 2013/0132205 A1* | 5/2013 | Harris ..................... | 705/14.65 |
| 2013/0246147 A1* | 9/2013 | Chen et al. .............. | 705/14.25 |
| 2013/0268380 A1* | 10/2013 | Hussie et al. ............ | 705/21 |
| 2013/0273879 A1* | 10/2013 | Eisen et al. .............. | 455/405 |

OTHER PUBLICATIONS

NFC Payments and the POS: White Paper by VeriFone May 2011: pp. 1-12.*

Mobile Payments in the United States Mapping Out the Road Ahead, Darin Contini and Marianne Crowe, Federal Reserve Bank of Boston, Mar. 25, 2011.

NFC Payments and the Point of Sale, VeriFone, May 2011.

* cited by examiner

TRANSFERRING DIGITAL RECEIPT DATA TO MOBILE DEVICES

RELATED APPLICATIONS

This application is related to U.S. application Ser. No. 13/556,011, filed Jul. 23, 2012 and U.S. application Ser. No. 13/556,024, filed Jul. 23, 2012.

BACKGROUND

1. Field of the Invention

This invention relates generally to the field of electronic sales transactions, and, more particularly, to transferring digital receipts to mobile devices.

2. Related Art

In a variety of transactions, consumers or buyers of goods or services typically receive receipts from their respective merchants or service providers as proof of existence of conducted transactions. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts can later be used by a consumer for various purposes including, for example, proving participation in a transaction for tax reporting purpose, product returns, use as a claim ticket for a further transaction, provisioning warranties, etc. For in-store purchases, consumers generally obtain a paper receipt at the point-of-sale. Accordingly, consumers frequently retain paper receipts for some amount of time after a transaction. Saved paper receipts can then be used by consumers later to return merchandise, to track expenses for budgeting purposes, or to substantiate tax, reimbursement, or warranty claims, among many other uses.

However, these later uses may be distant in time relative to when a transaction occurred. Weeks, months, or even years may pass before a consumer needs to use an old paper receipt. For example, one consumer may need to submit all receipts associated with business expenses to an employer at the end of a month for reimbursement purposes. Another consumer may need to submit all receipts related to charitable contributions to her accountant at the end of the tax year for income deduction purposes. In either of these instances, or the countless other instances in which a consumer has a need to retrieve old paper receipts, the consumer must rely on their past diligence in storing and organizing the paper receipts (and making sure the paper receipts do not become worn or damaged) in order to achieve her intended goal. For the average consumer, it is a time-consuming endeavor to locate the particular paper receipt(s) needed, and it may in fact prove to be impossible. Paper receipts are easily misplaced and difficult to organize—not only do they come in all different shapes and sizes, but they may only be categorized at the highest level in one manner, for example, by date or by subject matter.

Indeed, the high-level categorization initially chosen for organizational purposes may not be altered without a great deal of work, which is problematic when a particular paper receipt would be located most easily through a category other than the one chosen. As such, typically methods of saving paper receipts have at least a number of limitations. At best, these limitations cost consumers their time and sanity as they wade through old receipts to find what they need; at worst, they cost consumers much more—the inability to obtain a refund, a tax deduction, a reimbursement, etc.

Although receipts for telephone or online purchases may be delivered to a customer in digital format, this does not relieve, and in some environments may compound, organizational difficulties associated with paper receipts. For example, for telephone or online purchases, consumers may wait for a paper receipt to arrive in the mail, or may obtain an electronic receipt that they print to generate a paper receipt. These paper receipts must then be retained and organized with other paper receipts. Further, some consumers may never print the electronic receipts they obtain, and instead retain those receipts in electronic form, for example, in their email accounts. As such, consumers may store old receipts in one or more locations, both physical and electronic, and the stored receipts are only as organized as the particular consumer's efforts dictate.

Another drawback to the use of paper receipts is that, unlike credit/debit transactions, individual cash transactions are not stored in conventional point-of-sale ("POS") systems. Customers can read their own credit/debit transaction data at the websites of their banks or credit card companies. However, since the cash transactions are not stored, the paper receipts are the only record of these cash transactions.

A conventional POS system typically includes a POS terminal, one or more peripheral devices (display monitor, receipt printer, barcode scanner, weigh scale, electronic signature pad) and a payment processor with pin pad (for credit and debit cards). The data for sales transactions is usually stored in a storage device of the POS terminal, which may be uploaded to one of the remote transaction authorization server or another remote server of the credit/debit card companies. Although POS systems are well equipped for merchants to monitor and collect transaction data from the POS system, the ability of the customer to input or extract useful information from the POS system is typically limited to pin-pad interactions (entering tip amounts, obtaining additional cash back, etc.), and obtaining printed receipts, the format and content of which has been pre-determined by the merchant.

Further, POS systems are typically sold with a proprietary on-board software system that may be specific to the merchant's business. The merchant is able to make minor programming adjustments to add discount codes and other special offers, but has limited ability to add functionality to the POS system.

BRIEF DESCRIPTION OF THE DRAWINGS

The specific features, aspects and advantages of the present invention will become better understood with regard to the following description and accompanying drawings where.

DETAILED DESCRIPTION

Figure 1:
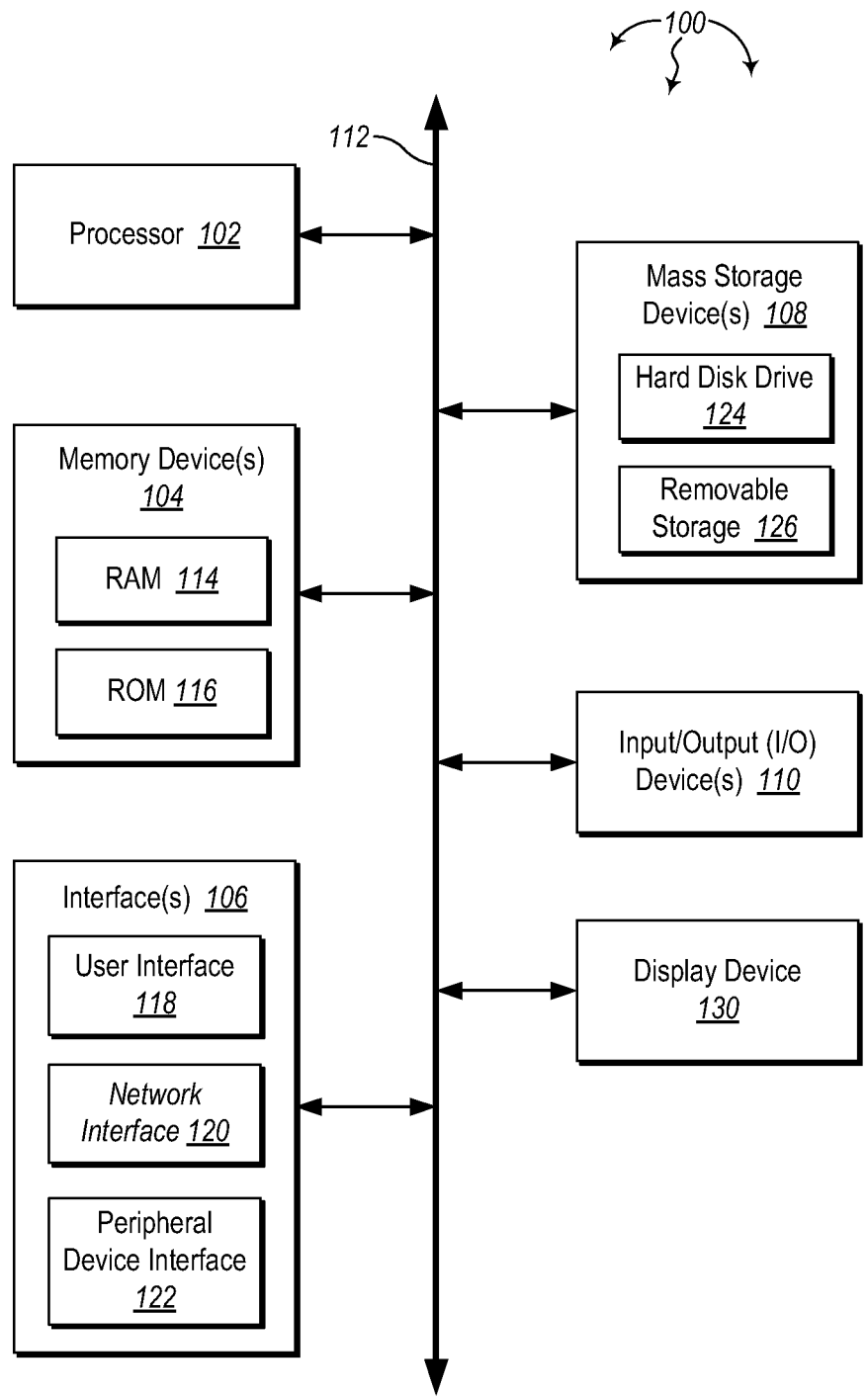
FIG. 1 illustrates an example block diagram of a computing device.

The present invention extends to methods, systems, and computer program products for transferring digital receipt data to mobile devices. In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

It is further noted that, where feasible, functions described herein can be performed in one or more of: hardware, software, firmware, digital components, or analog components. For example, one or more application specific integrated circuits ("ASICs") can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function In general, embodiments of the invention are directed to transferring digital receipt data to mobile devices. A point-of-sale ("POS") system generates digital receipt data as part of a sales transaction. The point-of-sale ("POS") system and a mobile device, possibly also along with a receipt data server, interoperate with one another to transfer digital receipt data generated to the mobile device.

In some embodiments, the point-of-sale ("POS") system transfers digital receipt data for a sales transaction to the receipt data server. An identifier, such as, for example, an application identifier or transaction identifier, is stored along with the digital receipt data to match the digital receipt data with the mobile device. The mobile device subsequently uses the identifier to access the digital receipt data from the receipt data server. In other embodiments, the point-of-sale ("POS") system transfers digital receipt data directly to the mobile device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
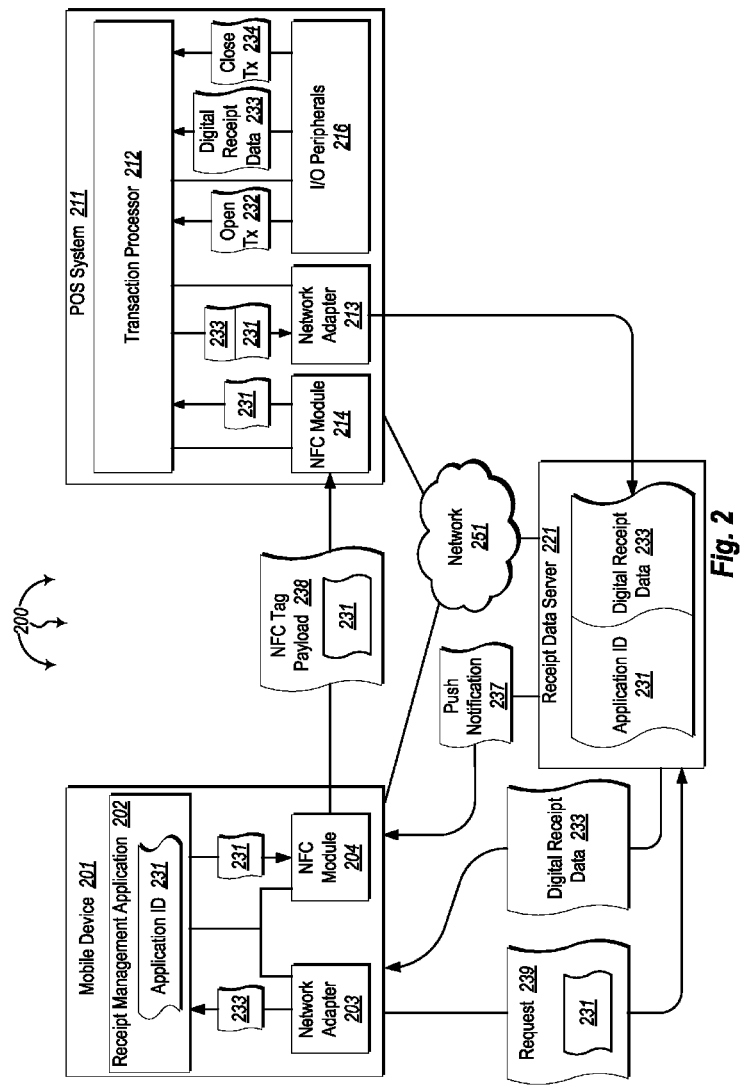
FIG. 2 illustrates an example computer architecture that facilitates transferring digital receipt data to mobile devices.

FIG. 2 illustrates an example computer architecture 200 that facilitates transferring digital receipt data to mobile devices. Referring to FIG. 2, computer architecture 200 includes mobile device 201, POS system 211, and receipt data server 221. Each of the depicted components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, mobile device 201 (e.g., a smartphone) further includes receipt management application 202, network adapter 203, and NFC module 204. Generally, receipt management application 202 is configured to manage receipt data for a user of mobile device 201. Receipt management application 202 can be used to perform receipt related operations, such as, for example, sorting receipt data, searching receipt data, itemizing receipt data, etc. in response to user-entered commands. Receipt management application 202 is also associated with application ID 231. Application ID 231 can be a unique ID used to distinguish receipt management application 202 (and thus also mobile device 201) from other receipt management applications (and thus also from other mobile devices).

Network adapter 203 can be a wireless network adapter for connecting mobile device 201 with a wireless network, such as, for example, Wi-Fi and/or a cellular network (e.g., CDMA, GSM, iDen, etc.) that facilitates a further connection to network 251 (e.g., the Internet). NFC module 204 is configured to connect mobile device 201 with other systems and devices using Near Field Communication.

As depicted, POS system 211 includes transaction processor 212, network adapter 213, NFC module 214, and I/O peripherals 216. POS 211 can be physically located at a checkout lane in a store. Generally, transaction processor 212 is configured to manage sales transactions for POS system 211. Transaction processor 212 can receive input from I/O peripherals 216 to open a sales transaction, collect digital receipt data (e.g., date, time, item, and cost data, etc.) for a sales transaction, and close a sales transaction. Digital receipt data for an item (e.g. item description and item cost) can be retrieved from an item database in response to scanning a barcode on (or otherwise identifying) the item. I/O peripherals 216 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Network adapter 213 can be a wired or wireless network adapter for connecting POS system 211 with a network, such as, for example, a Wi-Fi and/or wired Ethernet network, that facilitates a further connection to network 251 (e.g., the Internet). NFC module 214 is configured to connect POS system 211 with other systems and devices using Near Field Communication.

Generally, receipt data server 221 is configured to receive and store receipt data from POS system 211 (and possibly also one or more other POS systems). Receipt data server 221 is also connected to network 251. In some embodiments, receipt data server 221 is part of a backend system that receives receipt data from a plurality of POS systems distributed throughout different geographic locations. The plurality of POS systems and the backend system can be part of a commonly owned and/or controlled corporate network infrastructure.

Figure 3A:
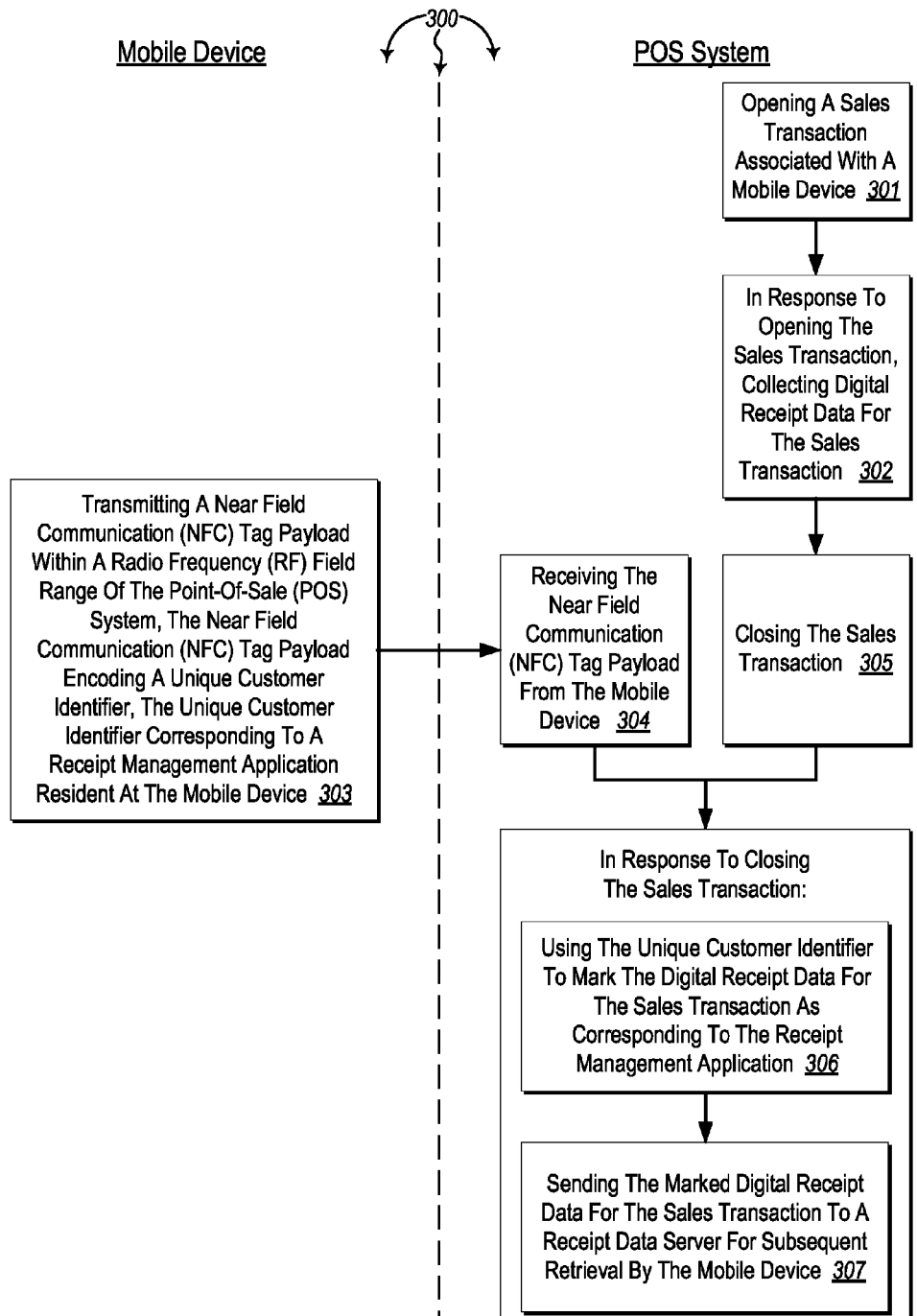
FIGS. 3A and 3B illustrates a flow chart of an example method for transferring digital receipt data to mobile devices.
Figure 3B:
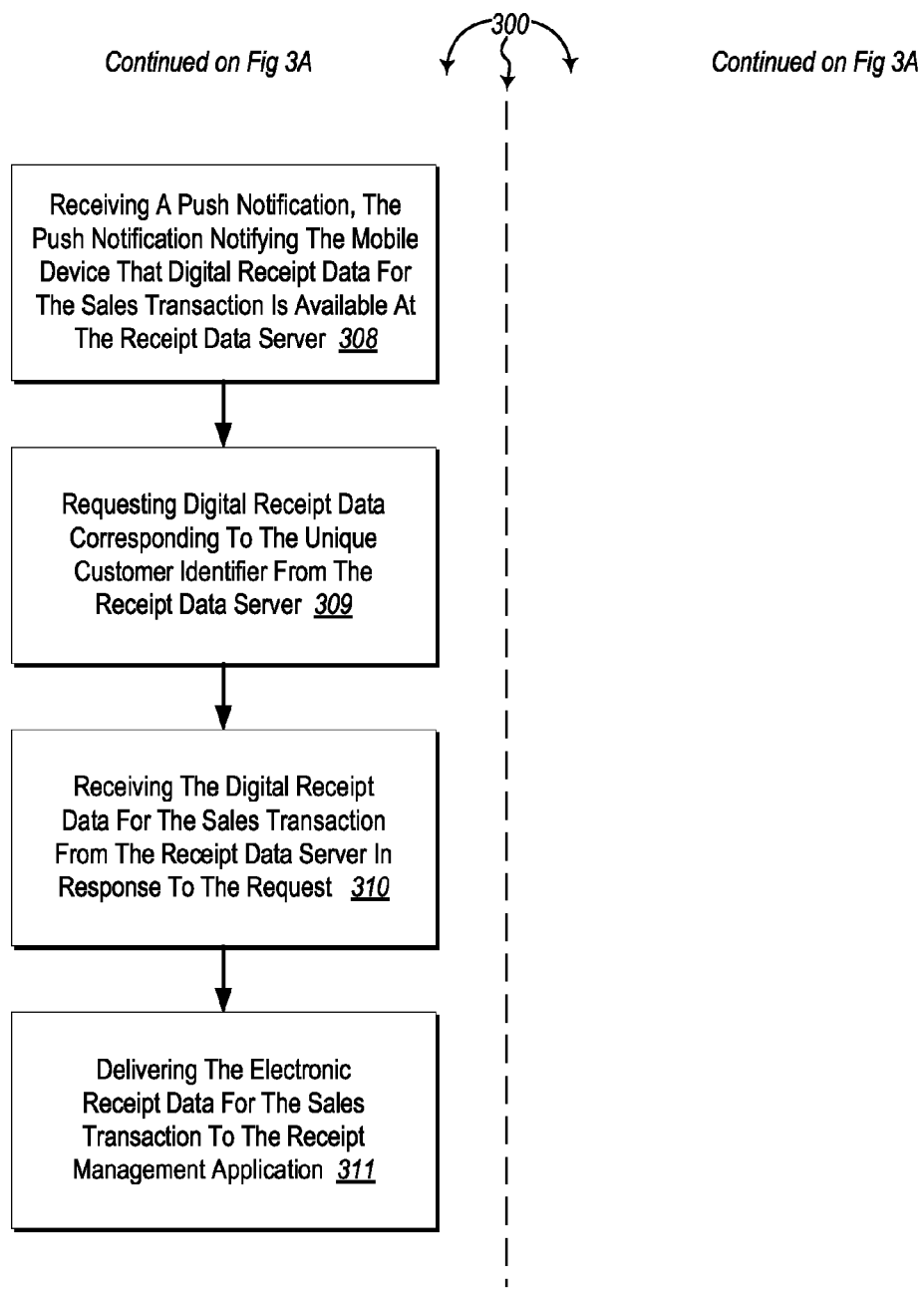

FIGS. 3A and 3B illustrate a flow chart 300 of an example method for transferring digital receipt data to mobile devices. Method 300 will be described with respect to the components and data of computer architecture 200.

Method 300 includes opening a sales transaction associated with a mobile device (301). A user of mobile device 201 can make one or more items they wish to purchase available to a cashier. The cashier can then process (e.g., scan) each of the items as part of a checkout procedure. Alternately, the user of mobile device 201 can process (e.g., scan) each of the one or more items himself or herself as part of a self-checkout procedure. As part of the checkout process, a cashier or the user of mobile device 201 can enter commands at I/O peripherals 216 to start a new sales transaction. In response, I/O peripherals 216 can send open transaction message 232 to transaction processor 212. Transaction processor 212 can receive open transaction message 232 from I/O peripherals 216. In response to open transaction message 232, transaction processor 212 can open a sales transaction to process the one or more items for the user of mobile device 201.

Method 300 includes in response to opening the sales transaction, collecting digital receipt data for the sales transaction (302). For example, in response to opening the sales transaction, transaction processor 212 can collect digital receipt data 233 for each of the one or more items that is processed (e.g., scanned) during the sales transaction.

Method 300 includes transmitting a Near Field Communication (NFC) tag payload within a Radio Frequency (RF) field range of the point-of-sale (POS) system, the Near Field Communication (NFC) tag payload encoding a unique customer identifier, the unique customer identifier corresponding to a receipt management application resident at the mobile device (303). For example, NFC module 204 can access application ID 231 from receipt management application 202. NFC module 204 can transmit NFC tag payload 238 within a RF field range of POS system 211. NFC tag payload 238 encodes application ID 231, a unique ID for receipt management application 202.

Method 300 includes receiving the Near Field Communication (NFC) tag payload from the mobile device (304). For example, NFC module 214 can receive NFC tag payload 238 from NFC module 204. NFC module 214 can decode application ID 231 from NFC tag payload 238 and send application ID 231 to transaction processor 212.

In these embodiments, mobile device 201 can function as an NFC tag and POS system 211 can function as an NFC reader. Mobile device 201 can be moved within a sufficient proximity of POS system 211 so that POS system 211 can receive NFC tag payload 238.

Method 300 includes closing the sales transaction (305). For example, when each of the one or more items has been processed (e.g., scanned), a cashier or the user of mobile device 201 can enter commands at I/O peripherals 216 to end the sales transaction. In response, I/O peripherals 216 can send close transaction message 234 to transaction processor 212. Transaction processor 212 can receive close transaction message 234 from I/O peripherals 216. In response to close transaction message 234, transaction processor 212 can close the sales transaction processing the one or more items for the user of mobile device 201.

Method 300 includes, in response to closing the sales transaction, using the unique customer identifier to mark the digital receipt data for the sales transaction as corresponding to the receipt management application (306). For example, transaction processor 212 can use application ID 231 to mark digital receipt data 233 as corresponding to receipt management application 202.

Method 300 includes, also in response to closing the sales transaction, sending the marked digital receipt data for the sales transaction to a receipt data server for subsequent retrieval by the mobile device (307). For example, network adapter 213 can access digital receipt data 233 marked with application ID 231 from transaction processor 212. Network adapter 213 can send digital receipt data 233 marked with application ID 231 to receipt data server 221.

Receipt data server can store digital receipt data 233 and retain the marking with application ID 231.

Method 300 includes receiving a push notification, the push notification notifying the mobile device that digital receipt data for the sales transaction is available at the receipt data server (308). For example, receipt data server 221 can send push notification 237 to mobile device 201. Alternately, POS system 211 can send push notification 237 to mobile device 201. Mobile device 201 can receive push notification 237 from receipt data server 221 (or alternately from POS system 211). Push notification 237 notifies mobile device 201 that digital receipt data 233 is available at receipt data server 221.

Method 300 includes requesting digital receipt data corresponding to the unique customer identifier from the receipt data server (309). For example, network adapter 203 can send request 239, containing application ID 231, to receipt data server 221. Request 239 requests any digital receipt data for receipt management application 202. Receipt data server 221 can receive request 239. Receipt data server 221 can use application ID 231 to match request 239 to digital receipt data 233. Receipt data server 221 can return digital receipt data 233 to mobile device 201.

Method 300 includes receiving the digital receipt data for the sales transaction from the receipt data server in response to the request (310). For example, network adapter 203 can receive digital receipt data 233 from data receipt data server 221. Method 300 includes delivering the electronic receipt data for the sales transaction to the receipt management application (act 311). For example, network adapter 203 can deliver digital receipt data 233 to receipt management application 202. Receipt management application 202 can then process digital receipt data 233 to sort digital receipt data 233, search digital receipt data 233, itemize digital receipt data 233, etc. in response to user-entered commands.

Figure 4:
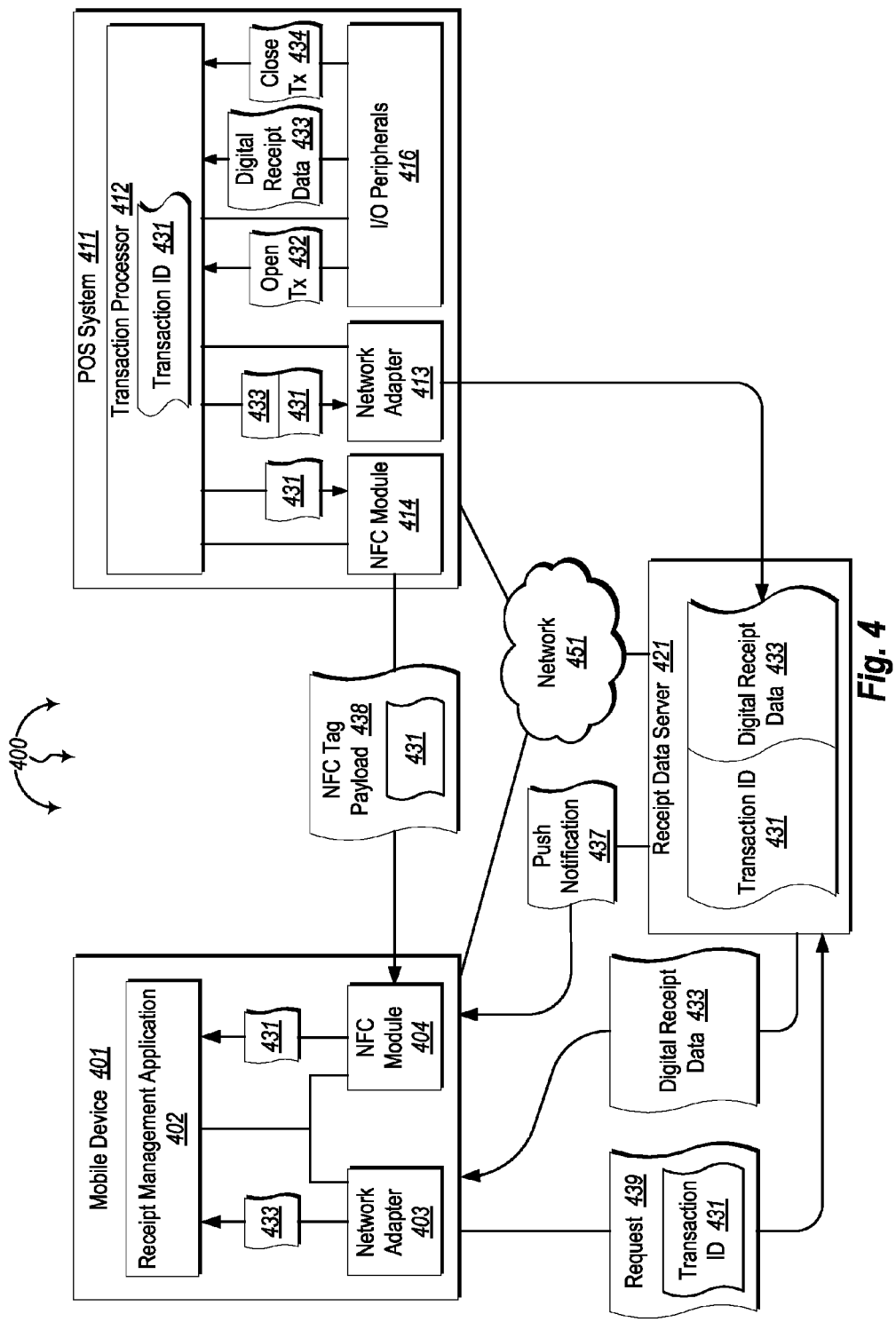
FIG. 4 illustrates another example computer architecture that facilitates transferring digital receipt data to mobile devices.

FIG. 4 illustrates an example computer architecture 400 that facilitates transferring digital receipt data to mobile devices. Referring to FIG. 4, computer architecture 400 includes mobile device 401, POS system 411, and receipt data server 421. Each of the depicted components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, mobile device 401 (e.g., a smartphone) further includes receipt management application 402, network adapter 403, and NFC module 404. Generally, receipt management application 402 is configured to manage receipt data for a user of mobile device 401. Receipt management application 402 can be used to perform receipt related operations, such as, for example, sorting receipt data, searching receipt data, itemizing receipt data, etc. in response to user-entered commands. However, receipt management application 402 is not associated with a unique ID. As such, receipt management application 402 may be incapable of unique identification relative to other receipt management applications interacting with POS system 411 or requesting digital receipt data from receipt data server 421.

Network adapter 403 can be a wireless network adapter for connecting mobile device 401 with a wireless network, such as, for example, Wi-Fi and/or a cellular network (e.g., CDMA, GSM, iDen, etc.) that facilitates a further connection to network 451 (e.g., the Internet). NFC module 404 is configured to connect mobile device 401 with other systems and devices using Near Field Communication.

As depicted, POS system 411 includes transaction processor 412, network adapter 413, NFC module 414, and I/O peripherals 416. POS 411 can be physically located at a checkout lane in a store. Generally, transaction processor 412 is configured to manage sales transactions for POS 411. Transaction processor 412 can receive input from I/O peripherals 416 to open a sales transaction, collect digital receipt data (e.g., date, time, item, and cost data, etc.) for a sales transaction, and close a sales transaction. Digital receipt data for an item (e.g. item description and item cost) can be retrieved from an item database in response to scanning a barcode on (or otherwise identifying) the item. I/O peripherals 416 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Network adapter 413 can be a wired or wireless network adapter for connecting mobile phone 401 with a network, such as, for example, a Wi-Fi and/or wired Ethernet network, that facilitates a further connection to network 451 (e.g., the Internet). NFC module 414 is configured to connect POS system 411 with other systems and devices using Near Field Communication.

Generally, receipt data server 421 is configured to receive and store receipt data from POS system 411 (and possibly also one or more other POS systems). Receipt data server 421 is also connected to network 451. In some embodiments, receipt data server 421 is part of a backend system that receives receipt data from a plurality of POS systems distributed throughout different geographic locations. The plurality of POS systems and the backend system can be part of a commonly owned and/or controlled corporate network infrastructure.

Figure 5A:
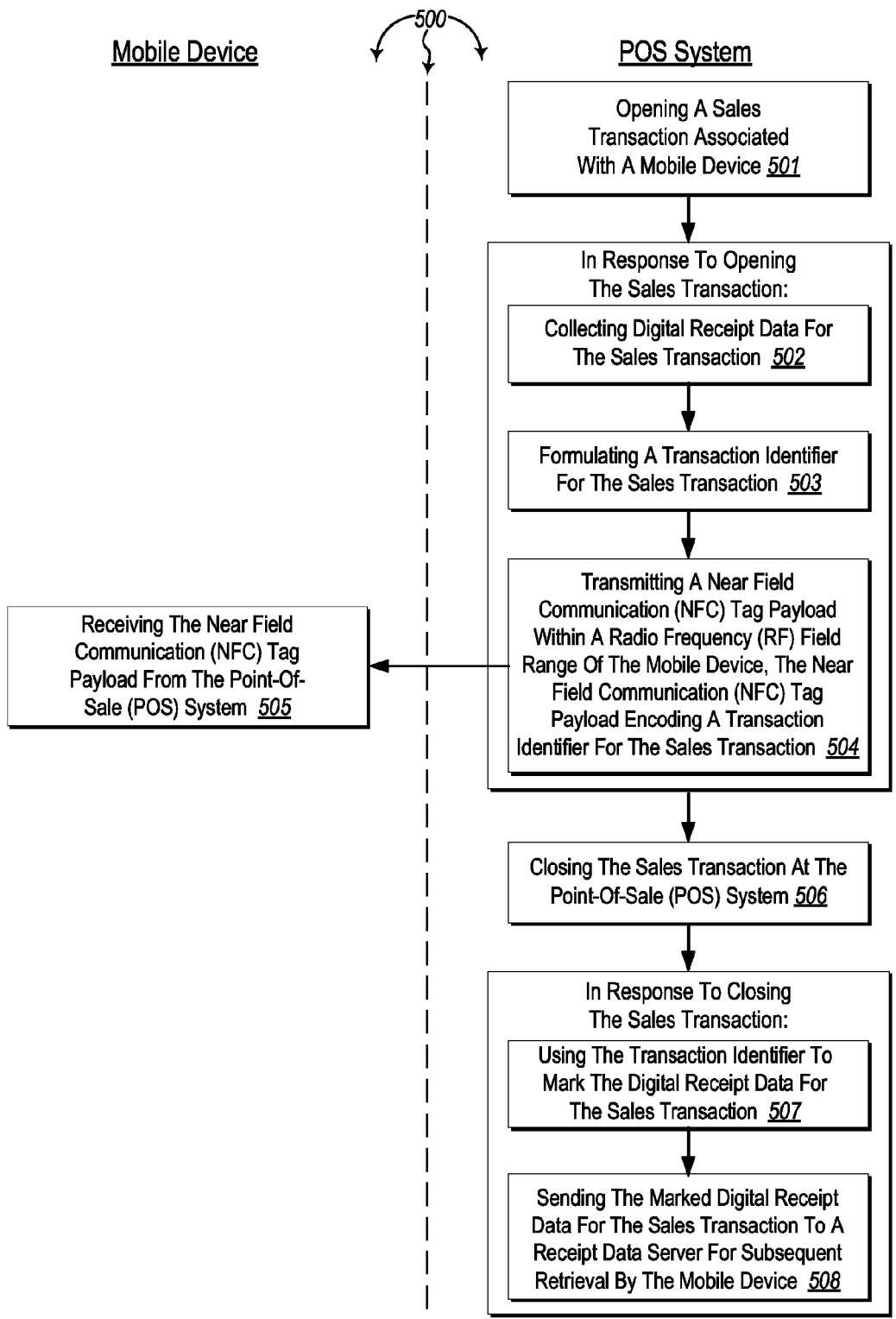
FIGS. 5A and 5B illustrates another flow chart of an example method for transferring digital receipt data to mobile devices.
Figure 5B:
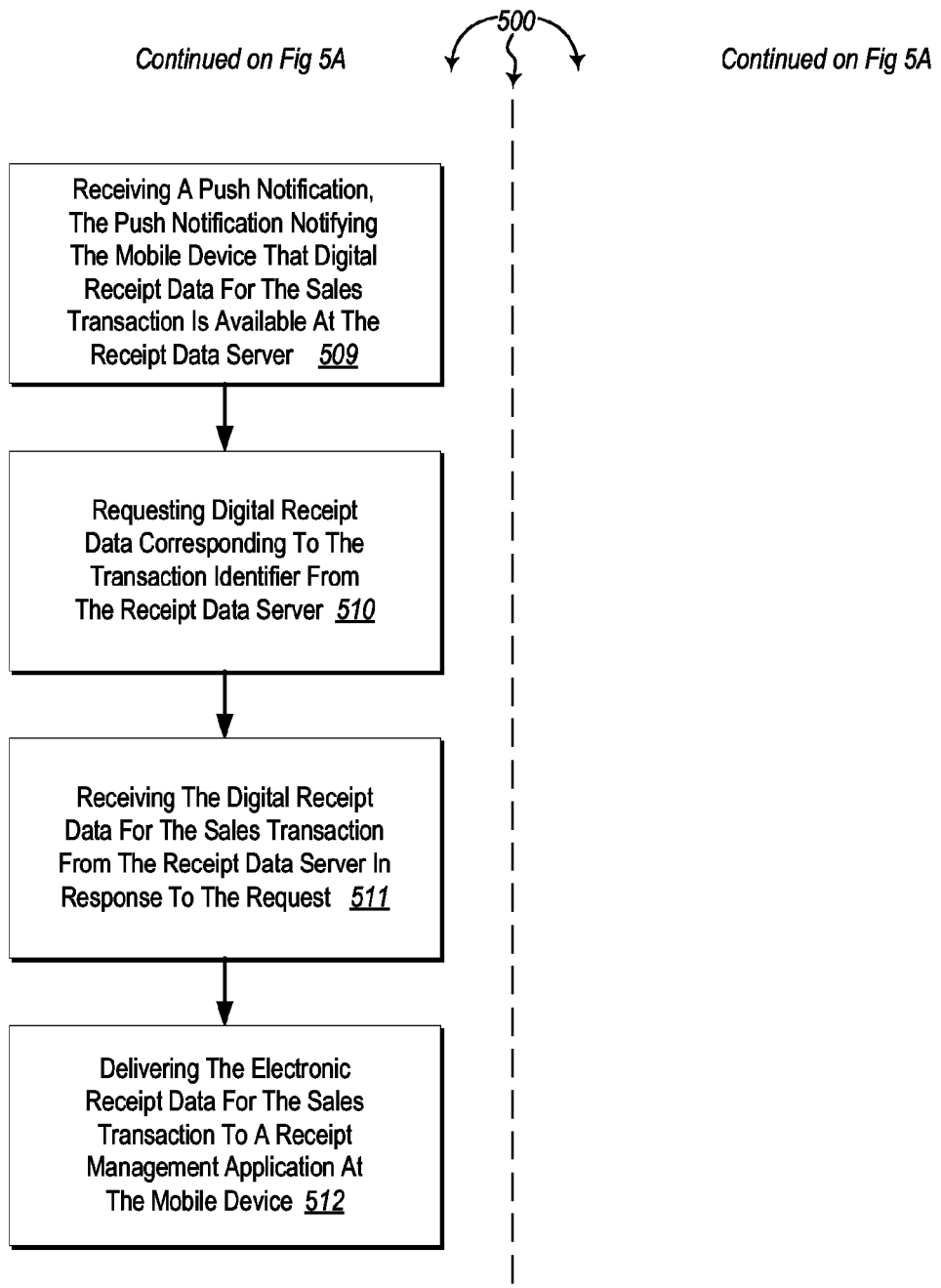

FIGS. 5A and 5B illustrate a flow chart of an example method 500 for transferring digital receipt data to mobile devices. Method 500 will be described with respect to the components and data of computer architecture 400.

Method 500 includes beginning a sales transaction associated with a mobile device (501). A user of mobile device 401 can make one or more items they wish to purchase available to a cashier. The cashier can then process (e.g., scan) each of the items as part of a checkout procedure. Alternately, the user of mobile device 401 can process (e.g., scan) each of the one or more items himself or herself as part of a self-checkout procedure. As part of the checkout process, a cashier or the user of mobile device 401 can enter commands at I/O peripherals 416 to start a new sales transaction. In response, I/O peripherals 416 can send open transaction message 432 to transaction processor 412. Transaction processor 412 can receive open transaction message 432 from I/O peripherals 416. In response to open transaction message 432, transaction processor 412 can open a sales transaction to process the one or more items for the user of mobile device 401.

Method 500 includes, in response to opening the sales transaction, collecting digital receipt data for the sales transaction (502). For example, in response to opening the sales transaction, transaction processor 412 can collect digital receipt data 433 for each of the one or more items that is processed (e.g., scanned) during the sales transaction.

Method 500 includes, also in response to opening the sales transaction, formulating a transaction identifier for the sales transaction (503). For example, in response to opening the sales transaction, transaction processor 412 can formulate transaction identifier 413 for the sales transaction. Transaction identifier 413 can be a unique transaction identifier relative to other transactions occurring at POS system 411 and to other transactions at other POS systems in communication with receipt data server 421.

Method 500 includes, also in response to opening the sales transaction, transmitting a Near Field Communication (NFC) tag payload within a Radio Frequency (RF) field range of the mobile device, the Near Field Communication (NFC) tag payload encoding the transaction identifier for the sales transaction (504). For example, in response to opening the sales transaction, NFC module 414 can access transaction ID 431 from transaction processor 412. NFC module 414 can transmit NFC tag payload 438 within a RF field range of mobile device 401. NFC tag payload 438 encodes transaction ID 431, a unique ID for the transaction.

Method 500 includes receiving the Near Field Communication (NFC) tag payload from the point-of-sale (POS) system (505). For example, NFC module 404 can receive NFC tag payload 438 from NFC module 414. NFC module 404 can decode transaction ID 431 from NFC tag payload 438 and send transaction ID 431 to receipt management application 402.

In these embodiments, mobile device 401 can function as an NFC reader and POS system 411 can function as an NFC tag. Mobile device 401 can be moved within a sufficient proximity of POS system 411 so that mobile device 401 can receive NFC tag payload 438.

Method 500 includes closing the sales transaction at the point-of-sale (POS) system (506). For example, when each of the one or more items has been processed (e.g., scanned), a cashier or the user of mobile device 401 can enter commands at I/O peripherals 416 to end the sales transaction. In response, I/O peripherals 416 can send close transaction message 434 to transaction processor 412. Transaction processor 412 can receive close transaction message 434 from I/O peripherals 416. In response to close transaction message 434, transaction processor 412 can close the sales transaction processing the one or more items for the user of mobile device 401.

Method 500 includes, in response to closing the sales transaction, using the transaction identifier to mark the digital receipt data for the sales transaction (507). For example, transaction processor 412 can use transaction ID 431 to mark digital receipt data 433 as corresponding to the transaction with mobile device 401.

Method 500 includes, also in response to closing the sales transaction, sending the marked digital receipt data for the sales transaction to a receipt data server for subsequent retrieval by the mobile device (508). For example, network adapter 413 can access digital receipt data 433 marked with transaction ID 431 from transaction processor 412. Network adapter 413 can send digital receipt data 433 marked with transaction ID 431 to receipt data server 421.

Method 500 includes receiving the push notification, the push notification notifying the mobile device that digital receipt data for the sales transaction is available at the receipt data server (509). For example, receipt data server 421 can send push notification 437 to mobile device 401. Alternately, POS system 411 can send push notification 437 to mobile device 401. Mobile device 401 can receive push notification 437 from receipt data server 421 (or alternately from POS system 411). Push notification 437 notifies mobile device 401 that digital receipt data 433 is available at receipt data server 421

Method 500 includes requesting digital receipt data corresponding to the transaction identifier from the receipt data server (510). For example, network adapter 403 can send request 439, containing transaction ID 431, to receipt data server 421. Request 439 requests any digital receipt data corresponding to the transaction associated with transaction ID 431. Receipt data server 421 can receive request 439. Receipt data server 421 can use transaction ID 431 to match request 439 to digital receipt data 433. Receipt data server 421 can return digital receipt data 433 to mobile device 401.

Method 500 includes receiving the digital receipt data for the sales transaction from the receipt data server in response to the request (511). For example, network adapter 403 can receive digital receipt data 433 from data receipt data server 421. Method 500 includes delivering the electronic receipt data for the sales transaction to a receipt management application at the mobile device (512). For example, network adapter 403 can deliver digital receipt data 433 to receipt management application 402. Receipt management application 402 can then process digital receipt data 433 to sort digital receipt data 433, search digital receipt data 433, itemize digital receipt data 433, etc. in response to user-entered commands.

Figure 6:
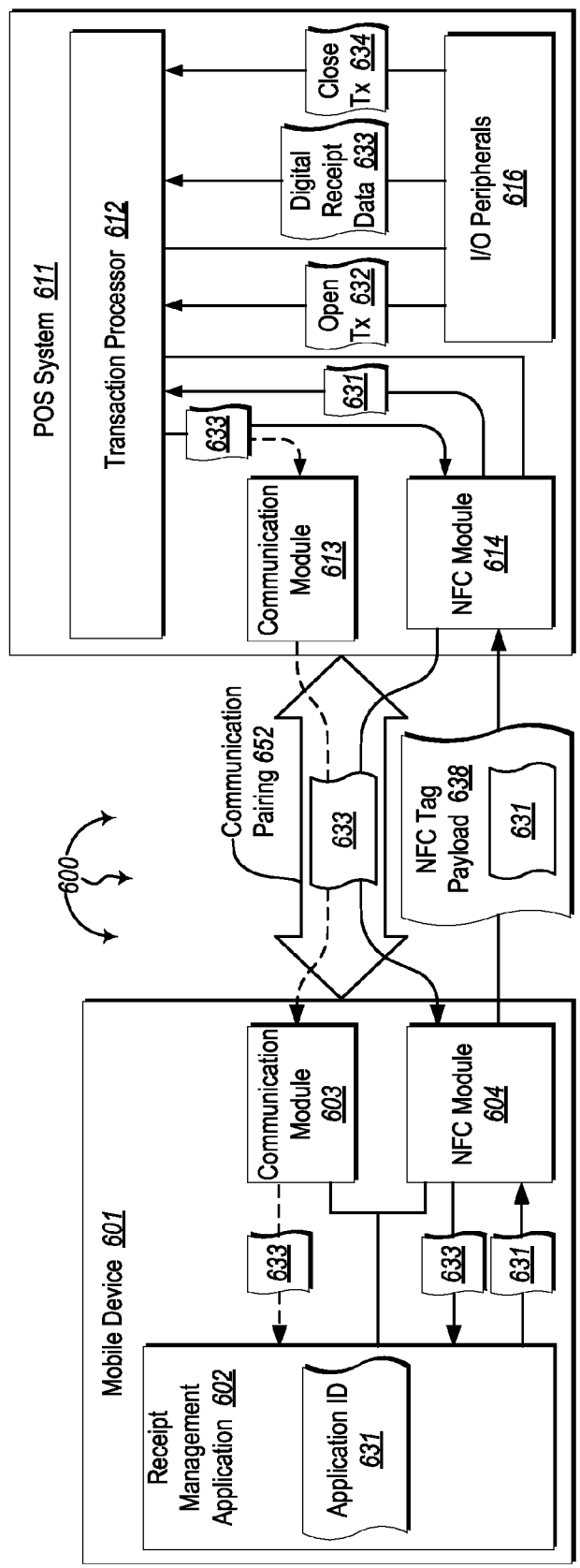
FIG. 6 illustrates a further example computer architecture that facilitates transferring digital receipt data to mobile devices.

FIG. 6 illustrates an example computer architecture 600 that facilitates transferring digital receipt data to mobile devices. Referring to FIG. 6, computer architecture 600 includes mobile device 601 and POS system 611. Each of the depicted components can be connected to one another over (or be part of) a network, such as, for example, a Personal Area Network ("PAN"), a Local Area Network ("LAN"), a Wide Area Network ("WAN"), and even the Internet. Accordingly, each of the depicted components as well as any other connected computer systems and their components, can create message related data and exchange message related data (e.g., near field communication (NFC) payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, mobile device 601 (e.g., a smartphone) further includes receipt management application 602, communication module 603, and NFC module 604. Generally, receipt management application 602 is configured to manage receipt data for a user of mobile device 601. Receipt management application 602 can be used to perform receipt related operations, such as, for example, sorting receipt data, searching receipt data, itemizing receipt data, etc. in response to user-entered commands. Receipt management application 602 is also associated with application ID 631. Application ID 631 can be a unique ID used to distinguish receipt management application 602 (and thus also mobile device 601) from other receipt management applications (and thus also from other mobile devices).

Communication module 603 can be a wireless network adapter for connecting mobile device 601 with a local wireless network, such as, for example, using Bluetooth and/or Wi-Fi. NFC module 604 is configured to connect mobile device 601 with other systems and devices using Near Field Communication.

As depicted, POS system 611 includes transaction processor 612, communication module 613, NFC module 614, and I/O peripherals 616. POS 611 can be physically located at a checkout lane in a store. Generally, transaction processor 612 is configured to manage sales transactions for POS 611. Transaction processor 612 can receive input from I/O peripherals 616 to open a sales transaction, collect digital receipt data (e.g., date, time, item, and cost data, etc.) for a sales transaction, and close a sales transaction. Digital receipt data for an item (e.g. item description and item cost) can be retrieved from an item database in response to scanning a barcode on (or otherwise identifying) the item. I/O peripherals 616 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication module 613 can be a wireless network adapter for connecting POS system 611 with a local wireless network, such as, for example, using Bluetooth and/or Wi-Fi. NFC module 604 is configured to connect mobile device 601 with other systems and devices using Near Field Communication.

Figure 7:
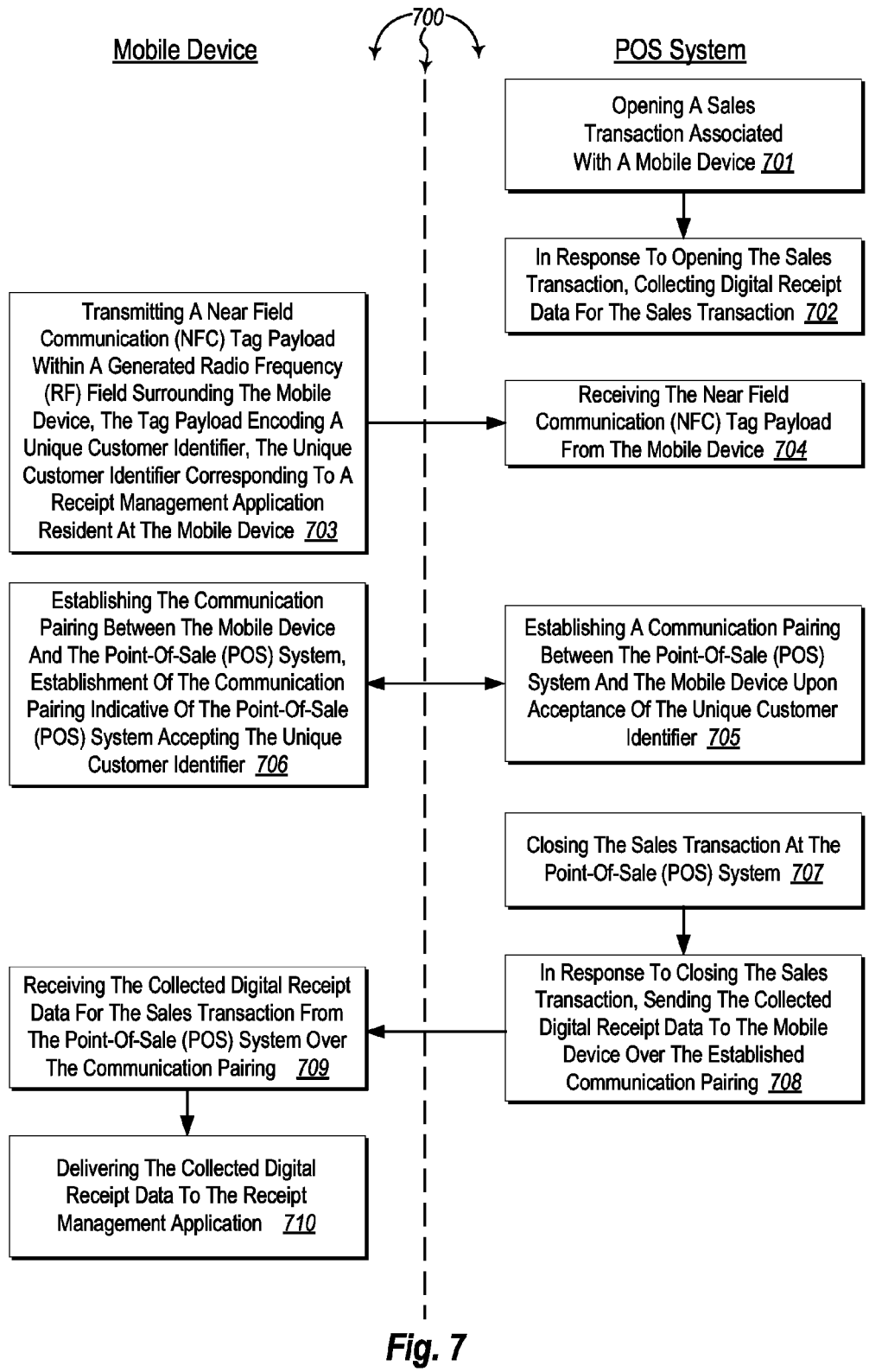
FIG. 7 illustrates further flow chart of an example method for transferring digital receipt data to mobile devices.

FIG. 7 illustrates a flow chart of an example method 700 for transferring digital receipt data to mobile devices. Method 700 will be described with respect to the components and data of computer architecture 600.

Method 700 includes opening a sales transaction associated with a mobile device (701). A user of mobile device 601 can make one or more items they wish to purchase available to a cashier. The cashier can then process (e.g., scan) each of the items as part of a checkout procedure. Alternately, the user of mobile device 601 can process (e.g., scan) each of the one or more items himself or herself as part of a self-checkout procedure. As part of the checkout process, a cashier or the user of mobile device 601 can enter commands at I/O peripherals 616 to open a new sales transaction. In response, I/O peripherals 616 can send open transaction message 632 to transaction processor 612. Transaction processor 612 can receive open transaction message 632 from I/O peripherals 616. In response to open transaction message 632, transaction processor 612 can open a sales transaction to process the one or more items for the user of mobile device 601.

Method 700 includes, in response to opening the sales transaction, collecting digital receipt data for the sales transaction (702). For example, in response to opening the sales transaction, transaction processor 612 can collect digital receipt data 633 for each of the one or more items that is processed (e.g., scanned) during the sales transaction.

Method 700 includes transmitting a Near Field Communication (NFC) tag payload within a generated Radio Frequency (RF) field surrounding the mobile device, the tag payload encoding a unique customer identifier, the unique customer identifier corresponding to a receipt management application resident at the mobile device (703). For example, NFC module 604 can access application ID 631 from receipt management application 602. NFC module 604 can transmit NFC tag payload 638 within a RF field range of POS system 611. NFC tag payload 638 encodes application ID 631, a unique ID for receipt management application 602.

Method 700 includes receiving the Near Field Communication (NFC) tag payload from the mobile device (704). For example, NFC module 614 can receive NFC tag payload 638 from NFC module 604. NFC module 614 can decode application ID 631 from NFC tag payload 638 and send application ID 631 to transaction processor 612.

Method 700 includes establishing a communication pairing between the point-of-sale (POS) system and the mobile device upon acceptance of the unique customer identifier (705). Method 700 includes establishing the communication pairing between the mobile device and the point-of-sale (POS) system, establishment of the communication pairing indicative of the point-of-sale (POS) system accepting the unique customer identifier (706). For example, upon POS system 611 accepting application ID 631 from mobile device 601, mobile device 601 and POS system 611 can establish communication pairing 652.

In some embodiments, communication pairing 652 is an NFC peer-to-peer data connection. For example, NFC module 604 and NFC module 614 can establish an NFC peer-to-peer data connection between mobile device 601 and POS system 611. In other embodiments, communication pairing 652 is a different longer range wireless communication protocol pairing, such as, Bluetooth or Wi-Fi. For example, based on provided functionality, communication module 603 and communication module 613 can establish a Bluetooth or a Wi-Fi connection between mobile device 601 and POS system 611.

Method 700 includes closing the sales transaction at the point-of-sale (POS) system (707). For example, when each of the one or more items has been processed (e.g., scanned), a cashier or the user of mobile device 601 can enter commands at I/O peripherals 616 to end the sales transaction. In response, I/O peripherals 616 can send close transaction message 634 to transaction processor 612. Transaction processor 612 can receive close transaction message 634 from I/O peripherals 616. In response to close transaction message 634, transaction processor 612 can close the sales transaction processing the one or more items for the user of mobile device 601.

Method 700 includes in response to closing the sales transaction, sending the collected digital receipt data to the mobile device over the established communication pairing (708). For example, in response to closing the sales transaction, POS system 611 can send digital receipt data 633 to mobile device 601 over communication pairing 652. When communication pairing 652 is a NFC peer-to-peer data connection, NFC module 614 can send digital receipt data 633 to NFC module 604. When communications pairing 652 is a Bluetooth or a Wi-Fi connection, communication module 613 can send digital receipt data 633 to communication module 603.

Method 700 includes receiving the collected digital receipt data for the sales transaction from the Point-Of-Sale (POS) system over the communication pairing (709). For example, mobile device 601 can receive digital receipt data 633 from POS system 611 over communication pairing 652. When communication pairing 652 is a NFC peer-to-peer data connection, NFC module 604 can receive digital receipt data 633 from NFC module 614. When communications pairing 652 is a Bluetooth or a Wi-Fi connection, communication module 603 can receive digital receipt data 633 from communication module 613.

Establishing a communication pairing for a different longer range wireless communication protocol can allow a user of mobile device 601 to move mobile device 601 further away from POS system 601 physically and still receive digital receipt data 633. For example, mobile device 601 can function as an NFC tag. POS system 611 can function as an NFC reader. Mobile device 601 can be moved within a sufficient proximity of POS system 611 so that POS system 611 can receive NFC tag payload 638. After NFC tag payload 638 is received, the user may desire to put mobile device 601 back in a pocket, purse, etc. NFC communication can be used to bootstrap a Bluetooth or Wi-Fi connection. Establishing communication pairing 652 as a Bluetooth or Wi-Fi connection can permit the user to "put away" a mobile device and remain within communication range of POS system 611.

Method 700 includes delivering the collected digital receipt data to the receipt management application (710). For example, as appropriate, NFC module 604 or communication module 603 can deliver digital receipt data 633 to receipt management application 602. Receipt management application 602 can then process digital receipt data 633 to sort digital receipt data 633, search digital receipt data 633, itemize digital receipt data 633, etc. in response to user-entered commands.

Figure 8:
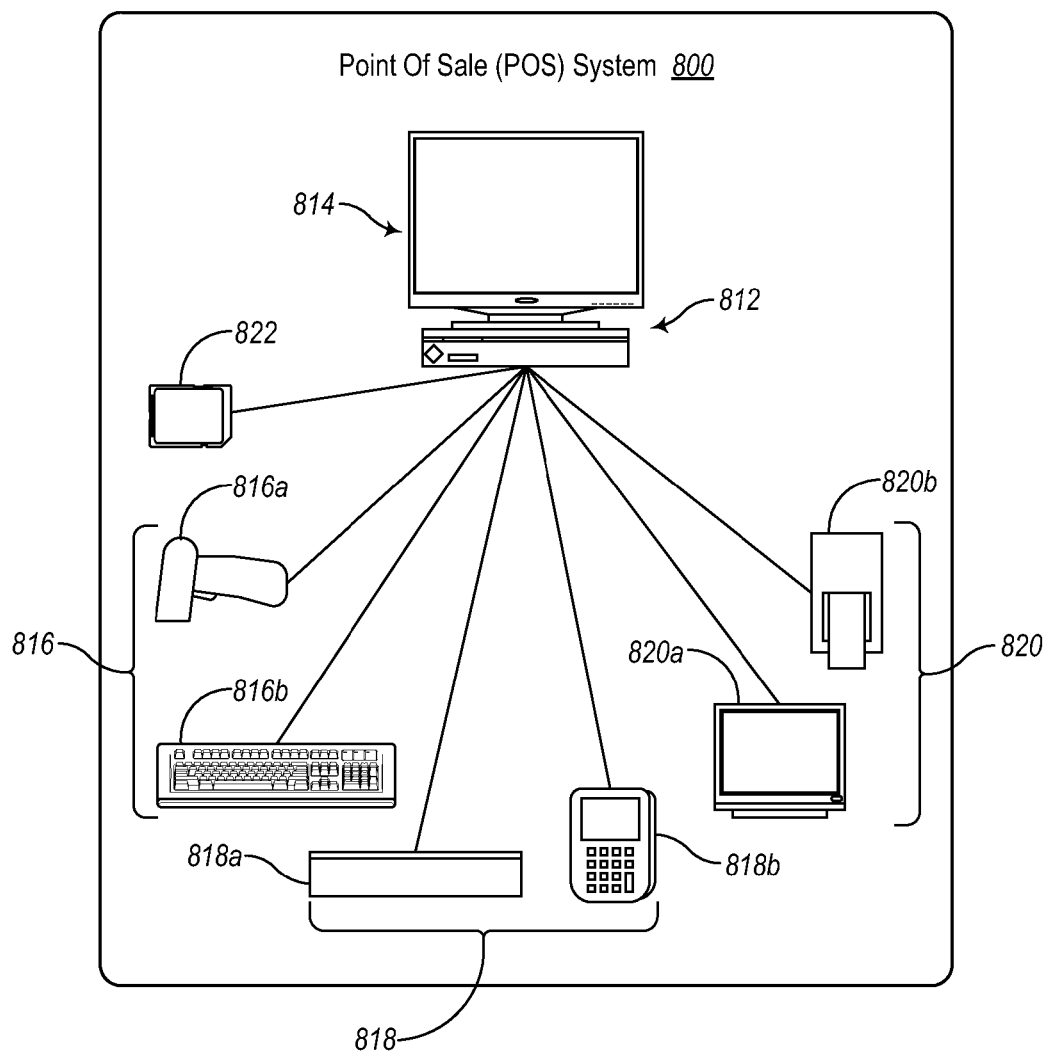
FIG. 8 illustrates an example schematic block diagram of a point-of-sale ("POS") system.

FIG. 8 illustrates an example schematic block diagram of a point-of-sale (POS) system 800. In some embodiments, the hardware, software, or hardware and software of POS system 800 may be configured to implement one or more methods in accordance with the present invention. For example, POS system 800 may be manufactured, programmed, modified, or upgraded to support transferring digital receipt data to mobile devices. Any of POS systems 211, 411, and 611 can be a POS system similar to POS system 800.

POS system 800 can include various components. In some embodiments, POS system 800 includes a central or primary computer 812, a monitor 814 (e.g., a cashier-facing monitor 814), one or more input devices 816 (e.g., scanners 816a, keyboards 816b, scales, or the like), one or more payment devices 818 (e.g., cash drawers 818a, card readers 818b) for receiving or returning payments, one or more output devices 820 (e.g., customer-facing display 820a or monitor 820a, receipt printer 820b), or the like or combinations or subcombinations thereof, and NFC module 822, such as, for example, an NFC dongle.

Computer 812 may form the backbone of POS system 800. Other components 816, 818, 820, 822 forming part of a POS system 800 can communicate with computer 812. Input devices 816 and certain payment devices 818 can feed data and commands to computer 812 for processing or implementation. For example, scanner 816a can pass data communicating the identity of one or more items to be purchased, returned, or the like to a computer 812. Similarly, card reader 818b can pass payment information to computer 812.

On the other hand, output devices 820 and certain payment devices 818 can follow or implement commands issued by computer 812. For example, cash drawer 818a may open in accordance with the commands of computer 812. Similarly, customer-facing display 820a and receipt printer 820b can display or output data or information as instructed by computer 812.

In some embodiments, in addition to handling consumer transactions (e.g., purchases, returns), POS system 800 can provide or support certain "back office" functionality. For example, POS system 800 can provide or support inventory control, purchasing, receiving and transferring products, or the like. POS system 800 can also store sales and customer information for reporting purposes, marketing purposes, receivables management, trend analysis, cost analysis, price analysis, profit analysis, or the like. If desired or necessary, POS system 800 can include an accounting interface to pass certain information to one or more in-house or independent accounting applications.

Figure 9:
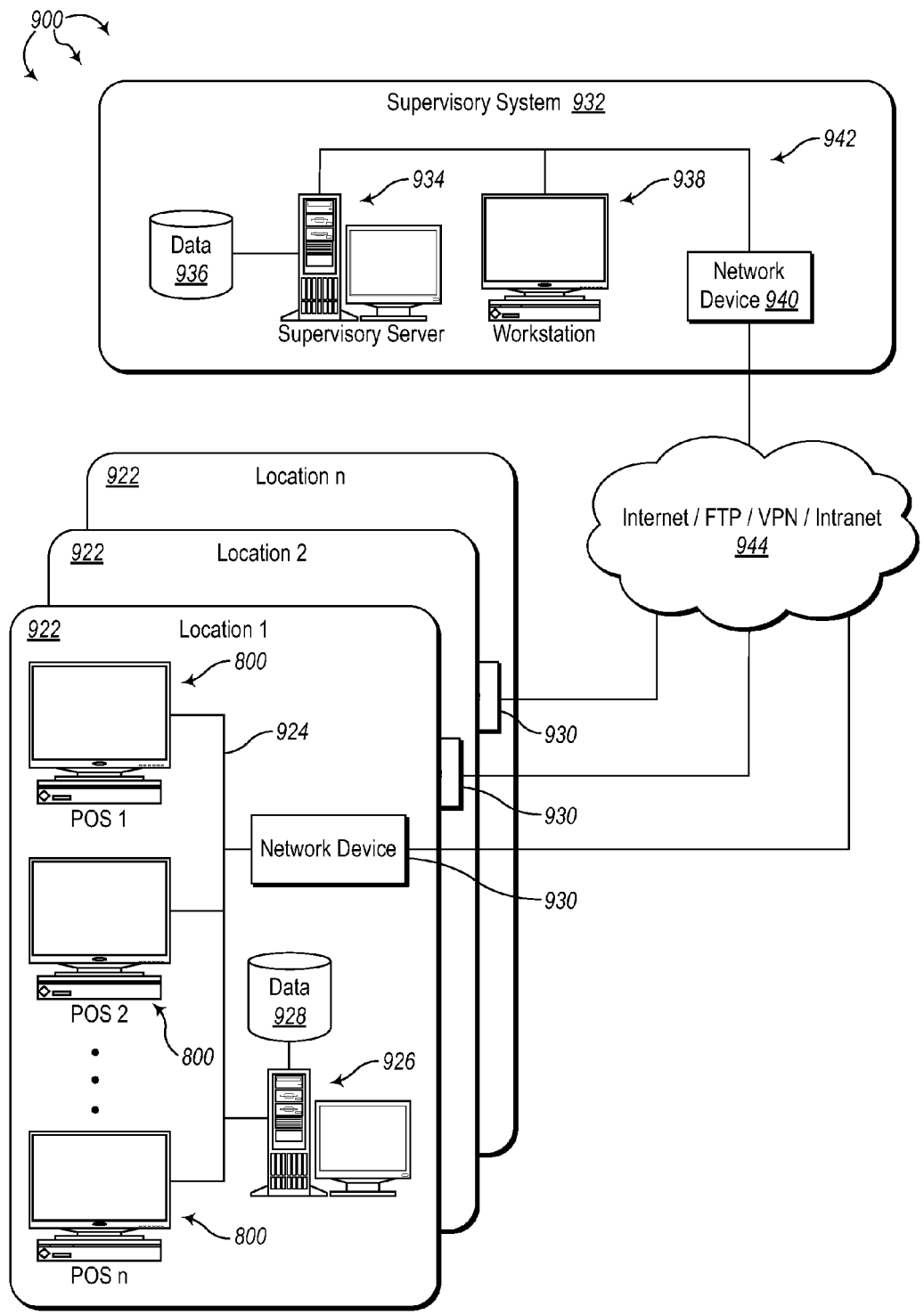
FIG. 9 illustrates an example schematic block diagram of a network of point-of-sale ("POS") systems.

In some embodiments, POS system 800 operates substantially independently, as a stand-alone unit. Alternately, POS system 800 may be one of several POS systems 800 forming the front line of a larger system. FIG. 9 illustrates an example schematic block diagram of a network 900 of point-of-sale (POS) systems 800. For example, multiple POS systems 800 may operate at a particular location 922 (e.g., within a retail, brick-and-mortar store). In such embodiments, the various POS systems 800 may be interconnected via LAN 924. LAN 924 may also connect the POS systems 800 to a local server 926.

Local server 926 can support the operation of the associated POS systems 800. For example, a server 926 may provide a central repository from which certain data needed by the associated POS systems 800 may be stored, indexed, accessed, or the like. Server 926 can serve certain software to one or more POS systems 800. In certain embodiments, a POS system 800 can offload certain tasks, computations, verifications, or the like to server 926.

Alternatively, or in addition thereto, server 926 can support certain back office functionality. For example, server 926 can receive and compile (e.g., within an associated database 928) data from the various associated POS systems 800 to provide or support inventory control, purchasing, receiving and transferring products, or the like. Server 926 can also receive and compile sales and customer information for reporting purposes, marketing purposes, receivables management, trend analysis, cost analysis, price analysis, profit analysis, or the like.

In some embodiments, one or more POS systems 800 and/or servers 926 corresponding to a particular location 922 can communicate with or access one or more remote computers or resources via one or more network devices 930. For example, a network device 930 can enable a POS system 800 to contact outside resources and verify the payment credentials (e.g., credit card information) provided by a customer. A network device 930 can comprise a modem, router, or the like.

In selected embodiments, POS systems 800 operate within an enterprise-wide system 931 comprising multiple locations 922 (e.g., branches 922 or stores 922). In such embodiments, each location 922 may have one or more POS systems 800, local servers 926, local databases 928, network devices 930, or the like or sub-combinations thereof connected by a computer network (e.g., a LAN 924). It may be that any of data receipt servers 221, 421, and 621 are included in and/or include the functionality of a local server 926.

Additionally, each such location 922 may be configured to interact with one or more supervisory systems 932. For example, multiple branch locations 922 may report to an associated "headquarters" location or system. It may be that any of data receipt servers 221, 421, and 621 are included in and/or include the functionality of a supervisory system 932.

A supervisory system 932 can include one or more supervisory servers 934, databases 936, workstations 938, network devices 940, or the like or combinations or sub-combinations thereof. The various components of a supervisory system 932 can be interconnected via a computer network (e.g., a LAN 942). In selected embodiments, a supervisory system 932 includes one or more supervisory servers 934 providing a central repository from which certain data needed by the one or more POS systems 800 or local servers 926 may be stored, indexed, accessed, or the like.

Alternatively, or in addition thereto, a supervisory server 934 can receive and compile (e.g., within an associated database 936) data from the various associated POS systems 800 or local servers 926 to provide or support inventory control, purchasing, receiving and transferring products, or the like. A supervisory server 934 may also receive and compile sales and customer information for reporting purposes, marketing purposes, receivables management, trend analysis, cost analysis, price analysis, profit analysis, or the like.

A supervisory system 932 can be connected to one or more associated locations 922 or branches 922 in via any suitable computer network 944 (e.g., WAN 944). For example, in selected embodiments, one or more locations 922 can connect to a supervisor system 932 via the Internet. Communication over such a network 944 can follow any suitable protocol or security scheme. For example, communication may utilize the File Transfer Protocol (FTP), a virtual private network (VPN), intranet, or the like.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method for transferring digital receipt data from a Point-Of-Sale (POS) computer system to a mobile device, the Point-Of-Sale (POS) computer system including one or more processors and system memory, the Point-Of-Sale (POS) computer system also including a Near Field Communication (NFC) module, the method comprising:
   opening a sales transaction at the Point-Of-Sale (POS) computer system;
   in response to opening the sales transaction, collecting digital receipt data for at least one item included in the sales transaction;
   one or more processors of the POS computer system executing the Near Field Communication (NFC) module to receive a Near Field Communication (NFC) tag payload from the mobile device, the Near Field Communication (NFC) tag payload encoding an application ID associated with and unique to a receipt management application resident at the mobile device;
   upon acceptance of the application ID, using the Near Field Communication (NFC) tag payload to establish a communication pairing between the Point-Of-Sale (POS) system and the mobile device;

closing the sales transaction at the Point-Of-Sale (POS) system; and in response to closing the sales transaction, sending the collected digital receipt data to the mobile device over the established communication pairing.

2. The method of claim 1, wherein the opening the sales transaction at the Point-Of-Sale (POS) computer system comprises receiving an indication from an I/O peripheral that the sales transaction is to be opened.

3. The method of claim 1, wherein the collecting the digital receipt data for the sales transaction, comprises for each of one or more items included in the sales transaction:

receiving an item identifier from a scanned bar code; and referring to a product database to access item description data and item cost data for the item.

4. The method of claim 1, wherein the closing the sales transaction at the Point-Of-Sale (POS) computer system comprises receiving an indication from an I/O peripheral that the sales transaction is to be closed.

5. The method of claim 1, wherein the using comprises using the Near Field Communication (NFC) tag payload to establish a Near Field Communication (NFC) peer-to-peer data connection between the Point-Of-Sale (POS) system and the mobile device.

6. The method of claim 5, wherein the sending the collected digital receipt data to the mobile device over the established communication pairing comprises sending collected digital receipt data to the mobile device over the Near Field Communication (NFC) peer-to-peer data connection.

7. The method of claim 1, wherein the using comprises using the Near Field Communication (NFC) tag payload to establish a different longer range wireless communication protocol pairing between the Point-Of-Sale (POS) system and the mobile device.

8. The method of claim 7, wherein the different longer range wireless communication protocol pairing comprises one of: a Bluetooth connection and a Wi-Fi connection between the Point-Of-Sale (POS) system and the mobile device.

9. The method of claim 8, wherein the sending the collected digital receipt data to the mobile device over the established communication pairing comprises sending collected digital receipt data to the mobile device over the one of: the Bluetooth connection or the Wi-Fi connection.

10. A method for a mobile device to receive digital receipt data from a Point-Of-Sale (POS) system, the mobile device including one or more processors and system memory, the mobile device also including a Near Field Communication (NFC) module, the method comprising:

one or more processors of the mobile device executing the Near Field Communication (NFC) module to transmit a Near Field Communication (NFC) tag payload within a generated Radio Frequency (RF) field surrounding the mobile device, the Near Field Communication (NFC) tag payload encoding an application ID associated with and unique to a receipt management application resident at the mobile device;

accepting, by the Point-Of-Sale system, the application ID;

upon the accepting, using the Near Field Communication (NFC) tag payload to establish a communication pairing between the mobile device and the Point-Of-Sale (POS) system;

receiving collected digital receipt data for the sales transaction from the Point-Of-Sale (POS) system over the communication pairing; and delivering the collected digital receipt data to the receipt management application.

11. The method of claim 10, wherein the using comprises using the Near Field Communication (NFC) tag payload to establish a Near Field Communication (NFC) peer-to-peer data connection between the mobile device and the Point-Of-Sale (POS) system.

12. The method of claim 11, wherein the receiving the collected digital receipt data for the sales transaction over the communication pairing from the Point-Of-Sale (POS) system comprises receiving collected digital receipt data for the sales transaction over the Near Field Communication (NFC) peer-to-peer data connection.

13. The method of claim 10, wherein the using comprises using the Near Field Communication (NFC) tag payload to establish a different longer range wireless communication protocol pairing between the mobile device and the Point-Of-Sale (POS) system.

14. The method of claim 13, wherein the different longer range wireless communication protocol pairing comprises one of: a Bluetooth connection and a Wi-Fi connection between the Point-Of-Sale (POS) system and the mobile device.

15. The method of claim 14, wherein the receiving the collected digital receipt data for the sales transaction over the communication pairing from the Point-Of-Sale (POS) system comprises receiving collected digital receipt data for the sales transaction over the one of: the Bluetooth connection or the Wi-Fi connection.

16. A method for transferring receipt data from a computer system corresponding to a retailer to a mobile device corresponding to a customer, the method comprising:

initiating, by a point-of-sale (POS) terminal of the computer system, a sales transaction;

collecting, by the POS terminal, the receipt data for the sales transaction;

receiving, by one or more processors of the computer system corresponding to a retailer executing a near-field-communication (NFC) module of the POS terminal, a NFC payload from the mobile device, the NFC payload encoding an application ID associated with and unique to a receipt management application resident at the mobile device;

accepting, by the computer system, the application ID;

by the computer system after the accepting, using the NFC payload to establish a communication pairing between the POS terminal and the mobile device;

completing, by the POS terminal, the sales transaction; and sending, by the POS terminal substantially immediately upon the completing, the receipt data to the mobile device over the established communication pairing.

17. The method of claim 16, wherein the communication pairing is based on a wireless communication protocol having a longer range than Near Field Communication (NFC).

18. The method of claim 17, wherein the communication pairing comprises one of a Bluetooth connection and a Wi-Fi connection.

* * * * *